United States Patent
Fletcher et al.

(10) Patent No.: US 6,477,298 B1
(45) Date of Patent: Nov. 5, 2002

(54) COLLECTION MODE LENS SYSTEM

(75) Inventors: Daniel A. Fletcher, Menlo Park, CA (US); Gordon S. Kino, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/858,294

(22) Filed: May 15, 2001

(51) Int. Cl.[7] .................................................. G02B 6/32
(52) U.S. Cl. ........................................... 385/33; 385/35
(58) Field of Search ............................... 385/33, 34, 35, 385/147

(56) References Cited

U.S. PATENT DOCUMENTS

| | | | | |
|---|---|---|---|---|
| 4,380,365 A | * | 4/1983 | Gross | 385/33 |
| 4,671,609 A | * | 6/1987 | Khoe et al. | 385/33 |
| 4,767,172 A | * | 8/1988 | Nichols et al. | 385/33 X |
| 5,004,307 A | | 4/1991 | Kino et al. | |
| 5,125,750 A | | 6/1992 | Corle et al. | |
| 5,764,613 A | | 6/1998 | Yamamoto et al. | |
| 5,786,947 A | | 7/1998 | Maeda et al. | |

* cited by examiner

Primary Examiner—Phan T. H. Palmer
(74) Attorney, Agent, or Firm—Dorsey & Whitney LLP

(57) ABSTRACT

A lens system including a collection lens and a microlens spaced from the collection lens adjacent the region to be observed. The diameter of the observablel region depends substantially on the radius of the microlens.

7 Claims, 2 Drawing Sheets

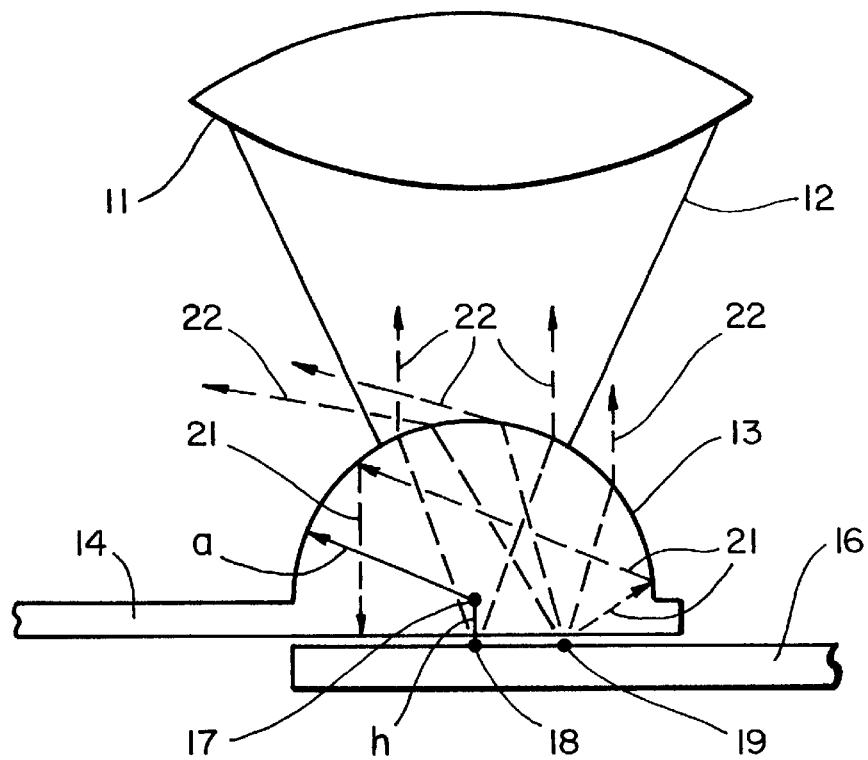
FIG_1
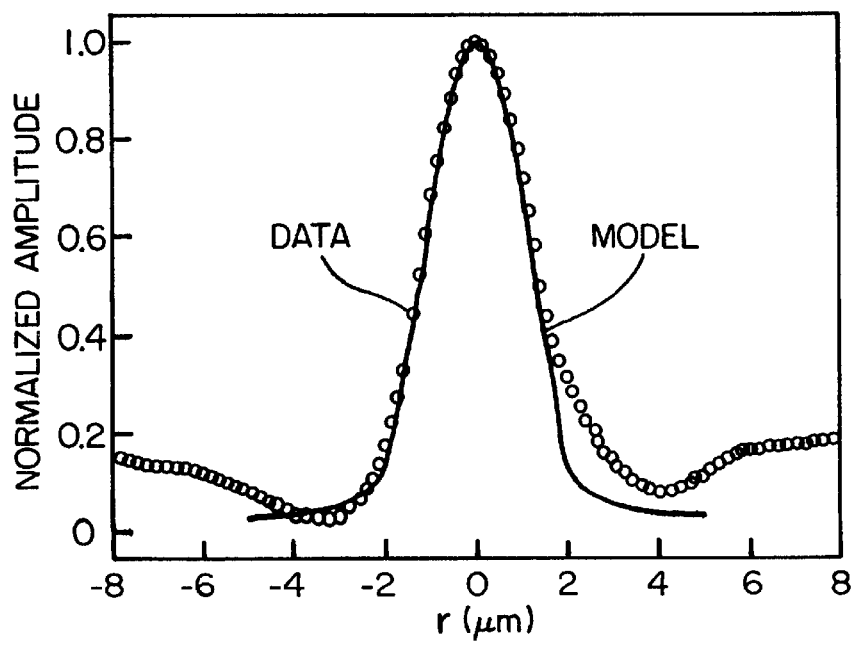
FIG_2

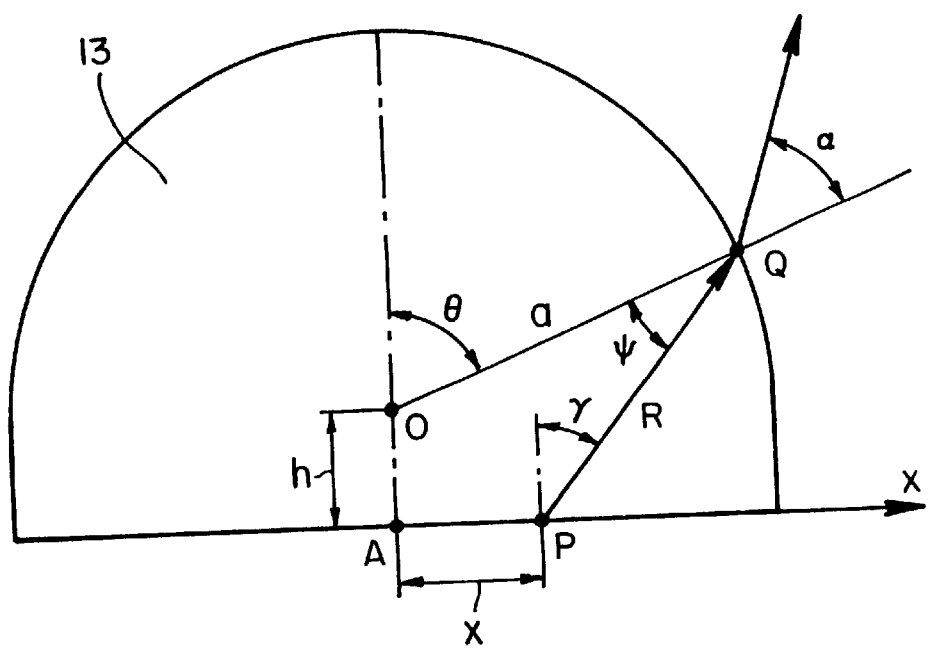
FIG_3
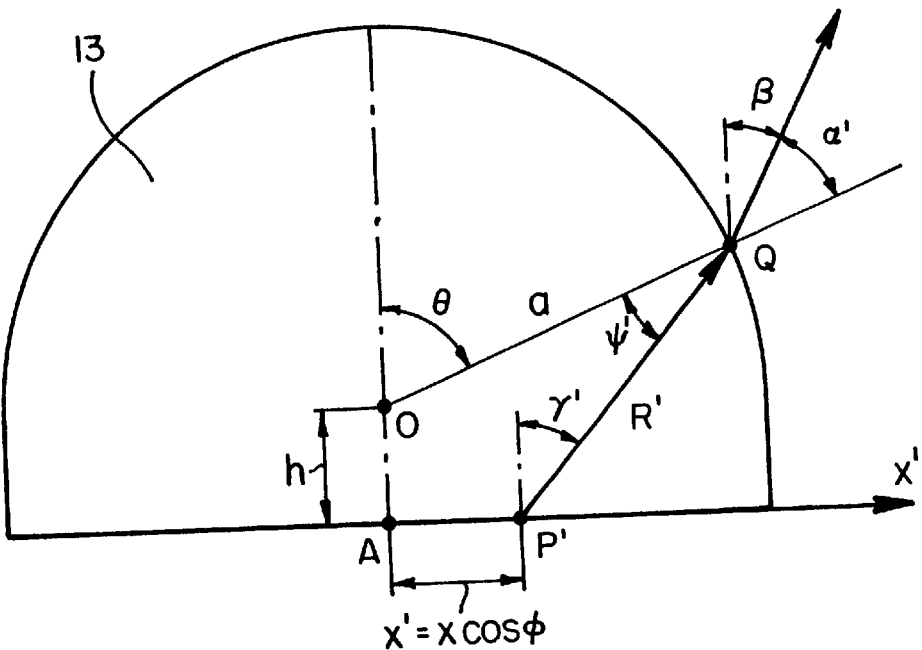
FIG_4

COLLECTION MODE LENS SYSTEM

GOVERNMENT SUPPORT

This invention was made with Government support under Contract No. ECS 9522 19555 awarded by the National Science Foundation. The Government has certain rights in this invention.

BRIEF DESCRIPTION OF THE INVENTION

This invention relates generally to a collection mode lens system, and more particularly to an optical system including a large area detector, a collecting lens and a small lens in which the field of view is determined by the acceptance angle or numerical aperture of the collecting lens, and the diameter of the small lens, and no pinhole is used in front of the detector.

BACKGROUND OF THE INVENTION

Micromachining techniques have enabled the fabrication of lenses with diameters comparable to the wavelength of light. Microlenses which are many wavelengths in diameter are used for collimation of fiber optics, wave-front sensing, and fill-factor improvement in detectors. Microlenses are also used for high spatial resolution solid immersion microscopy, where light is focused through a lens with a high index of refraction held close to the sample surface. Spherical aberration in a lens is inversely proportional to radius of curvature, making microlenses more tolerant to wave-front errors than large lenses.

As the diameter of a microlens is reduced, the ability of the lens to focus and collect light is affected. In a spherical lens, the field of view from which light is collected decreases with lens diameter. Microfabricated lenses with small fields of view can be used to direct beams of light by refracting off-axis rays. Small movements of a microlens in front of an optical fiber have been used for beam steering, optical interconnection and optical switching.

One is often interested in visualizing a small region on a sample. This is usually accomplished by a confocal arrangement using a lens with a pinhole in front of the detector. If the pinhole is small, the size of the region on the sample which is visualized is given by the diffraction limit of the objective lens combination.

SUMMARY OF THE INVENTION

The present invention is directed to a lens construction including a collecting lens and small or micro lens for collecting energy from a region of a sample in which the size of the region from which energy is collected is determined mainly by the size of the small or micro lens and the acceptance angle or numerical aperture of the collecting lens.

BRIEF DESCRIPTION OF THE DRAWINGS

The invention will be understood from the following description when read in connection with the accompanying drawings in which:

FIG. 1 is a ray diagram illustrating the apparatus of the present invention.

FIG. 2 Shows the spatial variation in collected intensity for a collector-lens combination.

FIGS. 3 and 4 are ray diagrams used in the detailed description of the operation of the present invention.

DESCRIPTION OF PREFERRED EMBODIMENT

Referring particularly to FIG. 1, there is shown an optical system comprising a collector lens 11 having an acceptance angle or numerical aperture (NA) 12 and a small lens 13 having a radius a. The small lens is formed by micromachining and is supported on a support 14. The lens combination collects light from the surface of sample 16 placed a distance h from the center 17 of the spherical small lens 13. The distance h may be positive or negative, but is chosen so that h<<a. The small lens 13 is made very small, typically a few microns in diameter. The field of view of the sample is then limited by the size of the lens 13. As is seen from the rays in FIG. 1, energy from a sample surface at a point 18 at the center of the small lens is collected by the collection lens 11 since it is diffracted so that it leaves the small lens at angles within the acceptance angle 12. However, some energy from a point 19 displaced from the center of a small lens is internally reflected, rays 21, while other energy is diffracted, rays 22, and most of that energy leaving the small lens is not collected by the collector lens.

In an experiment, a point source was moved across a small Si lens having a 9.4 $\mu$m diameter and the light from the point source was collected. The experiment was conducted at a source wavelength of 9.2 $\mu$m where the index of refraction of Si lens is 3.4. The collection lens was 0.45-NA BaF$_2$. The light source was a tapered, gold-coated chalcogenide glass fiber with a 1 $\mu$m diameter tip for the point source. The NA of the objectives limited the angular range of the collected light to angles less than $\sin^{-1}(NA)=27°$ from the normal. The collection objective was focused on the fiber tip, and the Si lens was inserted between the tip and the objective with the curved surface of the lens towards the objective. The small lens was held within the near field of the fiber, and light emitted from the tip was coupled into the small lens. The small lens was scanned over the tip while the fiber and objective remained stationary. Since the field of view of the collection objective was much larger than the scan range, movement of the small lens relative to the objective did not affect collection of light within the objective's NA.

When the center of the small lens was offset from the tip, we observed a decrease in collected light relative to a maximum when the small lens and tip are aligned. The variation of intensity with position of the point source from the center is shown in FIG. 2, which shows the normalized amplitude of the received energy. It is seen that the full width of half maximum (FWHM) of the spatial variation in collected intensity was approximately 1.8 $\mu$m or $\lambda/5$. We attribute this contrast mechanism to internal reflection in the small lens and refraction of rays outside the NA of the collection by the small lens.

Referring to FIGS. 3 and 4, an approximate explanation for the refraction mode of operation of the lens combination for a single point in a spread-out incoherent source is provided. First, it is determined how the illumination from a small spot is distributed in angles after it leaves the small lens 13. We assume that the detector is infinite in size and is located behind the collecting lens. We assume that the small lens is spherical in shape, and is illuminated from a small point P whose center is at a distance x from A on the axis.

A is a distance h in the axial direction from the center of the lens 13 of radius a, as shown in FIGS. 3 and 4. Of interest is the ray reaching the point Q at a, $\theta$, $\phi$ and the angle to the axis of the lens at which it leaves the lens. We take the angle between OQ and the axis to be $\theta$, and the angle between PQ and OQ as $\psi$. The direction cosines in the x, y and z directions of the line OQ in FIG. 3 are $\sin\theta\cos\phi$, $\sin\theta\sin\phi$, $\cos\theta$, respectively.

The length of the line PQ in FIG. 3 is R where $$R = \sqrt{(x - a\sin\theta\cos\phi)^2 + a^2\sin^2\theta\sin^2\phi + (h + a\cos\theta)^2} \quad (1)$$
$$= \sqrt{a^2 + h^2 + x^2 - 2ax\sin\theta\cos\phi + 2ah\cos\theta}$$

The direction cosines of the line PQ along the x, y and z directions are:

$$\frac{a\sin\theta\cos\phi - x}{R}, \frac{a\sin\theta\sin\phi}{R}, \frac{a\cos\theta + h}{R} \quad (2)$$

respectively.

It follows that:

$$\cos\Psi = [\sin\theta\cos\phi(a\sin\theta\cos\phi - x) + a\sin^2\theta\sin^2\phi + \cos\theta(a\cos\theta + h)]/R = (a - x\sin\theta\cos\phi + h\cos\theta)/R \quad (3)$$

We are interested in the exit angle of the rays from the small lens with respect to the lens axis. In order to find this angle, it is necessary to first find the angle between the projection of the line PQ on the plane AOQ. To do this, we first find the projection of AP on AOQ, which is $x\cos\phi$. Taking this to be the x' direction on the plane AOQ, as shown in FIG. 4, we find the directions cosines of the line OQ in the three directions to be $\sin\theta$, 0, $\cos\theta$, respectively.

Similarly, we find the direction cosines of the line P'Q in the x', y' and z directions in FIG. 4 to be:

$$\frac{a\sin\theta - x\cos\phi}{R'}, 0, \frac{a\cos\theta + h}{R'} \quad (4)$$

respectively, where $$R' = \sqrt{(a\sin\theta - x\cos\phi)^2 + (a\cos\theta + h)^2} \quad (5)$$
$$= \sqrt{a^2 + h^2 + x^2\cos^2\phi - 2ax\sin\theta\cos\phi + 2ah\cos\theta}$$

It follows that the angle $\psi'$ between the line P'Q and OQ in the plane OAQ of FIG. 4 is given by the relation $$\cos\psi' = [\sin\theta(a\sin\theta - x\cos\phi) + \cos\theta(a\cos\theta + h)]/R' \quad (6)$$
$$= \frac{a - x\sin\theta\cos\phi + h\cos\theta}{R'}$$

Since R'<R always, then $\psi' < \psi$.

We now calculate the angles of the rays exiting from the lens. Suppose that in the plane of FIG. 4, the exit ray makes an angle a with the radius OQ. Then, from Snell's law it follows that:

$$\sin\alpha' = n\sin\psi' \quad (7)$$

where $$\sin\alpha = n\sin\psi \quad (8)$$

Finally, if β is the angle that the exit ray makes with the axis, then $$\beta = \theta - \alpha \quad (9)$$

If the NA of the collecting lens is finite, only rays with $|\beta| < a\sin(NA)$ can enter the lens. Since β will depend on x, it follows that if x is sufficiently large in comparison to the diameter of the lens, very little light will enter the collection lens.

The field of view is also limited by internal reflection in the small lens which is also dependent upon the diameter of the small lens. The rays which leave the small lens are limited by the angle $\psi$. When $\psi > \arcsin(1/n)$ or $\sin\psi > 1/n$, where n is the refractive index of the lens, then there is total internal reflection of the ray reaching the lens surface. This effect is independent of the numerical aperture of the objective, and is more dominant for a lens made of a high refractive index material like silicon (n=3.4 and $\psi_{max}$=17°).

The spatial resolution is primarily controlled by three factors: the radius a of the microlens, the maximum collection angle θ of the collector lens (where NA=sin θ), the angle for total internal reflection $\psi_{max}$ and the maximum emission angle γ of a point on the sample. The latter factor is determined by the size and nature of the source region. For an infinitesimal diameter source γ→90° and we only consider that case. Wavelength γ is only a consideration if the microlens diameter is much smaller than the wavelength (d<<γ) such that the refracting surface is inside the radiation zone of the source.

We have modeled the relationship between microlens radius and angle with a three-dimensional ray-tracing program. The spatial resolution of the technique is directly proportional to microlens diameter for constant maximum collection and emission angles. Doubling the microlens diameter will double the, measured full-width at half maximum (FWHM) of a point source.

The microlens as described above will operate in collection mode at any size. However, the ability to resolve sub-wavelength features due to a limited field of view only occurs when the microlens diameter is smaller than a few wavelengths, for instance, for a silicon lens of refractive index 3.4, a<1.5λ. Consider a ray emitted vertically upwards into the spherical lens from a point source a distance x from the center of the lens. The angle $\psi$ between the ray and the radius of the lens is given at the point Q on the spherical surface by the relation $\sin\psi = x/a$, where a=d/2. If there is total internal reflection at this point, then x/a=1/n. For Si, 1/n=0.29, so x/a=0.29. For points on the spherical surface to the left of the point Q the rays are either totally internally reflected or refracted so they will not enter the objective. On the other hand, for points to the right of the apex, $\sin\psi < 1/n$ and the light will be transmitted. Therefore, approximately half the power is transmitted in this case. Hence, as x can be on either side of the center of the sphere, FWHM=2x=0.58 a. More generally, for microlens lenses made of material having a refractive index n, the relationship for the diameter d of the spot within the field of view becomes d=2x=2a/n. Thus, the spot size is proportional to the radius of the lens and inversely proportional to the refractive index n of the lens.

Thus, the energy from the sample can only enter the collecting aperture from a small region on the sample, limited by the size of the microlens and the numerical aperture of the objective. The diameter of this region is proportional to the radius a of the microlens which, for the observation of wavelength or subwavelength features, must be in the order of a few wavelengths. This diameter d depends primarily on the diameter of the microlens and, secondly, on the numerical aperture of the objective. Thus, the spot size depends on the field of view of the lens and not on the diffraction limits. Like a pinhole or tapered fiber, the spot size d depends only on the geometry and is smaller than that given by the diffraction limit. Although the foregoing description has been primarily directed to a spherical or hemispherical lens. The collection mode will operate with an aspheric lens or a spherical lens with finite h. In all instances, the curved surface faces the collection lens.

There has been provided a collector lens microlens combination for viewing small spots on a surface. The lens combination can be used to measure the temperature in spectroscopy in small regions, since the spot size is proportional to the radius of the lens, and inversely proportional to the refractive index of the lens, and is substantially independent of wavelength. The lens operating in the collection mode can collect energy from a small region which is independent of the wavelength of the energy. Therefore, the lens is suitable for spectral analysis of the absorption or emission from a small region over a range of wavelengths. It is also suitable for measuring thermal emission, particularly in the infrared range from 1 to 100 microns.

Thus, the applications for collection imaging include fluorescence microscopy, spectroscopy and thermal imaging.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention, and various embodiments with various modifications as are suited to the particular use are contemplated. It is intended that the scope of the invention be defined by the claims appended hereto and their equivalents.

What is claimed is:

1. A collection mode lens system for resolving features comprising:
    a collection lens, and
    a microlens of a material having an index of refraction n with a curved surface facing the collector lens and an opposite surface spaced from the features to be resolved, said microlens having a radius a which is given by the size of the features in wavelengths divided by 1/n, where n is the refractive index of the microlens material.

2. A collection mode lens system as in claim 1 in which the curved surface is substantially hemispherical.

3. A collection mode lens system as in claim 1 in which the microlens is aspheric.

4. A collection mode lens system as in claim 1, 2 or 3 in which the feature size is less than a wavelength, and the material is silicon, and the radius a of the microlens is $a < 1.5\lambda$.

5. A collection mode lens system for collecting energy from a source of predetermined diameter comprising:
    a collection lens, and
    a microlens adjacent the source and spaced from the collection lens, said microlens having a radius which is given by the predetermined diameter of the energy source divided by 1/n where n is the refractive index of the microlens material.

6. A collection mode lens system as in claim 5 wherein the predetermined diameter is less than one wavelength $\lambda$, the microlens material is silicon and the radius a of the microlens is $a < 1.5\lambda$.

7. The method of observing an area of predetermined diameter which comprises the steps of:
    placing a microlens adjacent the predetermined area, said microlens having a radius which is given by the predetermined diameter divided by 1/n where n is the refractive index of the lens material, and
    collecting energy transmitted by the microlens from the predetermined area by a collection lens having a numerical aperture which captures the transmitted energy.

* * * * *

UNITED STATES PATENT AND TRADEMARK OFFICE
CERTIFICATE OF CORRECTION

| | | |
|---|---|---|
| PATENT NO. | : 6,477,298 B1 | Page 1 of 1 |
| APPLICATION NO. | : 09/858294 | |
| DATED | : November 5, 2002 | |
| INVENTOR(S) | : Fletcher et al. | |

It is certified that error appears in the above-identified patent and that said Letters Patent is hereby corrected as shown below:

In The Specification Under Column 1:

• Please replace lines 4-7 with:

-- This invention was made with Government support under contract DE-G03-00ER45815 awarded by the Department of Energy. The Government has certain rights in this invention. --

Signed and Sealed this
Tenth Day of May, 2011

David J. Kappos
*Director of the United States Patent and Trademark Office*